United States Patent [19]

Thomsen

[11] Patent Number: 5,798,915
[45] Date of Patent: Aug. 25, 1998

[54] PROGRESSIVE START-UP CHARGE PUMP AND METHOD THEREFOR

[75] Inventor: Joseph A. Thomsen, Gilbert, Ariz.

[73] Assignee: Microchip Technology Incorporated, Chandler, Ariz.

[21] Appl. No.: 891,343

[22] Filed: Jul. 10, 1997

Related U.S. Application Data

[60] Provisional application No. 60/091,773, Jan. 29, 1997.

[51] Int. Cl.[6] .................. H02M 3/18; G05F 3/02
[52] U.S. Cl. .................. 363/60; 327/536; 323/901
[58] Field of Search .................. 363/60; 327/536; 307/110; 323/901

[56] References Cited

U.S. PATENT DOCUMENTS

| | | | |
|---|---|---|---|
| 4,053,821 | 10/1977 | Hose, Jr. et al. | 363/60 |
| 4,149,232 | 4/1979 | Eaton, Jr. | 363/60 |
| 5,059,815 | 10/1991 | Bill et al. | 363/60 |
| 5,394,320 | 2/1995 | Blodgett | 363/60 |
| 5,436,587 | 7/1995 | Cernea | 327/536 |
| 5,642,073 | 6/1997 | Manning | 327/536 |

*Primary Examiner*—Stuart N. Hecker
*Attorney, Agent, or Firm*—Harry M. Weiss; Jeffrey D. Moy; Harry M. Weiss & Associates, P.C.

[57] ABSTRACT

A progressive start-up charge pump that eliminates the start-up problems of p-channel charge pump stages by starting the charge pump one stage at a time. The charge pump has a plurality of charge pump stages wherein each of the plurality of charge pump stages are coupled to a successive charge pump stage in a cascade mode. An enabling circuit is coupled to each of the plurality of charge pump stages for individually starting each of the plurality of charge pump stages one charge pump stage at a time starting with a last charge pump stage and successively turning on a directly previous charge pump stages until the first charge pump stage is started. This will ensure that the voltage output node is at a greater potential than the voltage input node for each of the plurality of charge pump stages during start-up.

14 Claims, 2 Drawing Sheets

5,798,915

PROGRESSIVE START-UP CHARGE PUMP AND METHOD THEREFOR

RELATED APPLICATION

This application claims the priority of U.S. Provisional Application No. 60/091,773 filed Jan. 29, 1997 in the name of the same inventor(s) and having the same title, specification, initially filed patent claims and drawings.

BACKGROUND OF THE INVENTION

1. Field of the Invention

This invention relates generally to charge pumps and, more specifically, to a progressive start-up charge pump that eliminates the start-up problems of p-channel charge pump stages by starting the charge pump one stage at a time.

2. Description of the Prior Art

Previously, charge pump stages were implemented using low threshold native devices. However, the implementation of charge pump stages using low threshold devices was not adequate. The gamma of the low threshold devices was too high and at low power supply voltages, the number of stages needed for the charge pump to reach desired levels was prohibitive.

For the above stated reason, many charge pump stages are now implemented using pmos devices. While the pmos devices may solve the threshold issue, new problems are introduced when the pmos devices are used. When constructed on an N-well process, a parasitic vertical pnp device is formed between the pmos device and the substrate for each stage. If the input voltage of a stage rises above the output voltage, the pnp device is biased on and the charge is shunted to the substrate which is grounded. If the charge pump is clocked correctly and there is not an excessive current drain on the output of the stage, this will not be a problem once the charge pump has reached a steady state operating point. However, a problem exists at start-up since all the stages of the charge pump are at the same potential.

Therefor, a need existed to provide an improved multiple stage charge pump wherein each stage is implemented using pmos devices. The improved multiple stage charge pump is a progressive start-up charge pump wherein the charge pump is started one stage at a time starting with the output stage and working back towards the first stage. By starting the improved multiple stage charge pump one stage at a time starting with the output stage and working back towards the first stage, the output of each stage is guaranteed to be at a higher potential than the input to the stage. This will ensure that none of the vertical pnp devices get activated during start-up of the progressive start-up charge pump.

SUMMARY OF THE INVENTION

In accordance with one embodiment of the present invention, it is an object of the present invention to provide an improved multiple stage charge pump.

It is another object of the present invention to provide an improved multiple stage charge pump wherein each stage is implemented using pmos devices.

It is another object of the present invention to provide an improved multiple stage charge pump wherein each stage is implemented using pmos devices, and the improved multiple stage charge pump is started one stage at a time starting with the output stage and working back towards the first stage.

It is still another object of the present invention to provide an improved multiple stage charge pump wherein each stage is implemented using pmos devices, and the improved multiple stage charge pump is started one stage at a time starting with the output stage and working back towards the first stage such that the output of each stage is guaranteed to be at a higher potential than the input to the stage thereby ensuring that none of the vertical pnp devices get activated during start-up of the progressive start-up charge pump.

BRIEF DESCRIPTION OF THE PREFERRED EMBODIMENTS

In accordance with one embodiment of the present invention, a progressive start-up charge pump is disclosed. The progressive start-up charge pump has a plurality of charge pump stage means for generating a desired output voltage for the progressive start-up charge pump. Each of the plurality of charge pump stage means are implemented using p-channel devices. Each of the plurality of charge pump stage means has a voltage input node and a voltage output node and are coupled together such that each of the plurality of charge pump stage means are coupled to a successive charge pump stage means in a cascade mode. Enabling means are coupled to each of the plurality of charge pump stage means. The enabling means are used for individually starting each of the plurality of charge pump stage means one charge pump stage means at a time starting with the last charge pump stage means and successively turning on a directly previous charge pump stage means until the first charge pump stage means is started. The enabling means are further used to ensure that the voltage output node is at a greater potential than the corresponding voltage input node for each of the plurality of charge pump stage means.

In accordance with another embodiment of the present invention, a method of providing a progressive start-up charge pump is disclosed. The method comprises the steps of: providing a plurality of charge pump stage means for generating a desired output voltage for the progressive start-up charge pump wherein each of the plurality of charge pump stage means is implemented using p-channel devices, each of the plurality of charge pump stage means has a voltage input node and a voltage output node such that each of the plurality of charge pump stage means are coupled to a successive charge pump stage means in a cascade mode; and providing enabling means coupled to each of the plurality of charge pump stage means for individually starting each of the plurality of charge pump stage means one charge pump stage means at a time starting with a last charge pump stage means and successively turning on a directly previous charge pump stage means until the first of the plurality of charge pump stage means is started and for ensuring that the voltage output node is at a greater potential than the voltage input node for each of the plurality of charge pump stage means.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
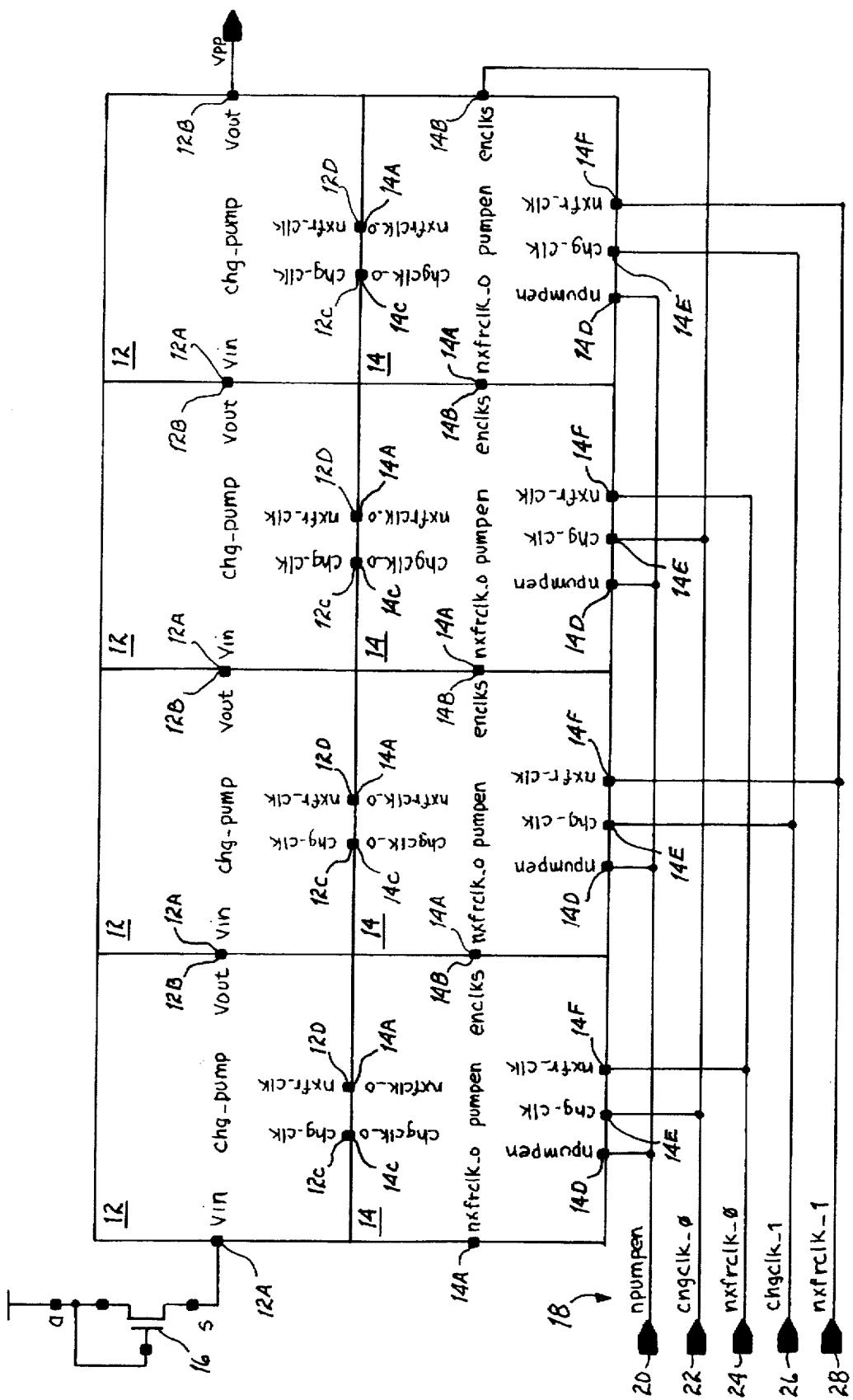
FIG. 1 is a simplified functional block diagram of the progressive start-up multiple stage charge pump of the present invention.

Referring to FIG. 1. a progressive start-up charge pump 10 (hereinafter charge pump 10) is shown. The charge pump 10 has a plurality of charge pump stages 12. Although only four charge pump stages 12 are shown, additional or fewer stages could be used depending on the desired output voltage required by the charge pump 10. Each of the charge pump stages 12 has a voltage input 12A and a voltage output 12B. The charge pump stages 12 are coupled together in cascade such that the voltage output 12B is coupled to a voltage input 12A of a directly successive charge pump stage 12. However, the first charge pump stage has a voltage input coupled to a diode connect transistor 16 while the voltage output 12B of the last charge pump stage is used to output the desired output voltage level for the charge pump 10.

Each of the charge pump stages 12 is coupled to a corresponding charge pump enable circuit 14. The charge pump enable circuits 14 each have a charge clock output 14C and a transfer clock output 14A. The charge clock output 14C and the transfer clock output 14A of each charge pump enable circuit 14 is coupled respectively to a charge clock input 12C and a transfer clock input 12D of a corresponding charge pump stage 12. Each charge pump enable circuit 14 also has an enable clock input 14B. The charge pump enable circuits 14 are all coupled together in a cascade mode such that the transfer clock output 14A of a charge pump enable circuit 14 is coupled to an enable clock input 14B of a directly previous charge pump enable circuit 14.

The charge pump enable circuits 14 are used to start each of the plurality of charge pump stages 12. The charge pump enable circuits 14 are coupled to a plurality of signal lines 18. The signal lines 18 are used to control each of the charge pump enable circuits 14 such that charge pump enable circuits 14 will active each of the charge pump stages 12 one stage at a time. Each of the charge pump stages 12 are activated individually starting with the last charge pump stage and successively turning on a directly previous charge pump stage until the first charge pump stage is started.

The plurality of signal lines 18 includes a pump enable signal line 20. The pump enable signal line 20 is coupled to a pump enable input 14D of each charge pump enable circuit 14. The pump enable signal line 20 sends a reset signal which is used to turn off the charge pump 10. When the signal on the pump enable signal line 20 goes high, all the charge pump stages 12 are turned off by turning off the clock signal to each charge pump enable circuit 14. When the signal on the pump enable signal line 20 goes low, the charge pump 10 is activated and ready for a progressive start-up.

The plurality of signal lines 18 also includes a first charge clock line 22 and a second charge clock line 26. The first charge clock signal line 22 is coupled to an enable clock input 14B of the last charge pump enable circuit and to charge clock inputs 14E of the penult charge pump enable circuit and alternate charge pump enable circuits after the penult charge pump enable circuit. The first charge clock signal line 22 is used to send an enable clock signal to the enable clock input 14B of the last charge pump enable circuit and for raising the voltage level at the voltage input 12A of the penult charge pump stage and alternate charge pump stages after the penult charge pump stage. The second charge clock signal line 26 is coupled to the charge clock input 14E of the last charge pump enable circuit and alternate charge pump enable circuits after the last charge pump enable circuit. The second charge clock signal line 26 is used for raising the voltage level at the voltage input 12A of the last charge pump stage and alternate charge pump stages after the last charge pump stage.

The plurality of signal lines 18 also includes a first transfer clock line 24 and a second transfer clock line 28. The first transfer clock signal line 24 is coupled to a transfer clock input 14E of the penult charge pump enable circuit and alternate charge pump enable circuits after the penult charge pump enable circuit. The first transfer clock signal line 24 is used to send a transfer clock signal to the penult charge pump enable circuit and alternate charge pump enable circuits after the penult charge pump enable circuit to allow a charge to be transfer from the voltage input 12A to a voltage output 12B of the penult charge pump stage and alternate charge pump stages after the penult charge pump stage. The second transfer clock signal line 28 is coupled to a transfer clock input 14E of the last charge pump enable circuit and alternate charge pump enable circuits after the last charge pump enable circuit. The second transfer clock signal line 28 is used to send a transfer clock signal to the last charge pump enable circuit and alternate charge pump enable circuits after the last charge pump enable circuit to allow a charge to be transfer from the voltage input 12A to a voltage output 12B of the last charge pump stage and alternate charge pump stages after the last charge pump stage.

Figure 2:
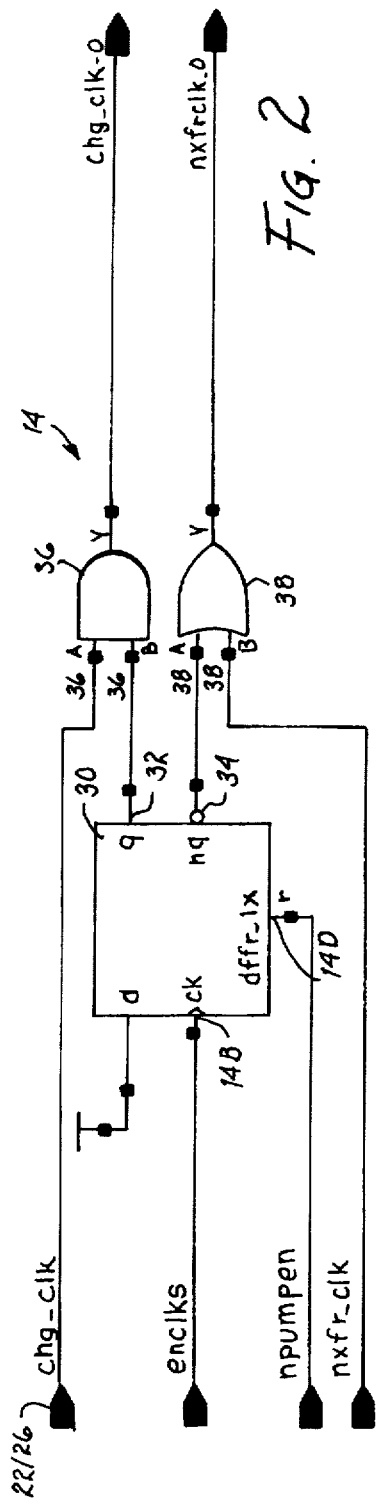
FIG. 2 is a simplified functional block diagram of an enabling circuit used to charge each stage of the progressive start-up multiple stage charge pump depicted in FIG. 1.

Referring to FIG. 2 wherein like numerals and symbols represent like elements, a charge pump enable circuit 14 is shown in detail. The charge pump enable circuit 14 has a flip flop 30 which has an enable clock input 14B and a pump enable input 14D. The output 32 of the flip flop is coupled to an input 36B of an AND gate 36 while the inverted output 34 of the flip flop 30 is coupled to an input 38A of an OR gate 38. A second input 36A of the AND gate 36 is coupled to one of the charge clock signal lines 22 or 26 depending on where the charge pump enable circuit 14 is positioned in the charge pump 10. A second input 38B of the OR gate 38 is coupled to one of the transfer clock signal lines 24 or 28 depending on where the charge pump enable circuit 14 is positioned in the charge pump 10.

Figure 3:
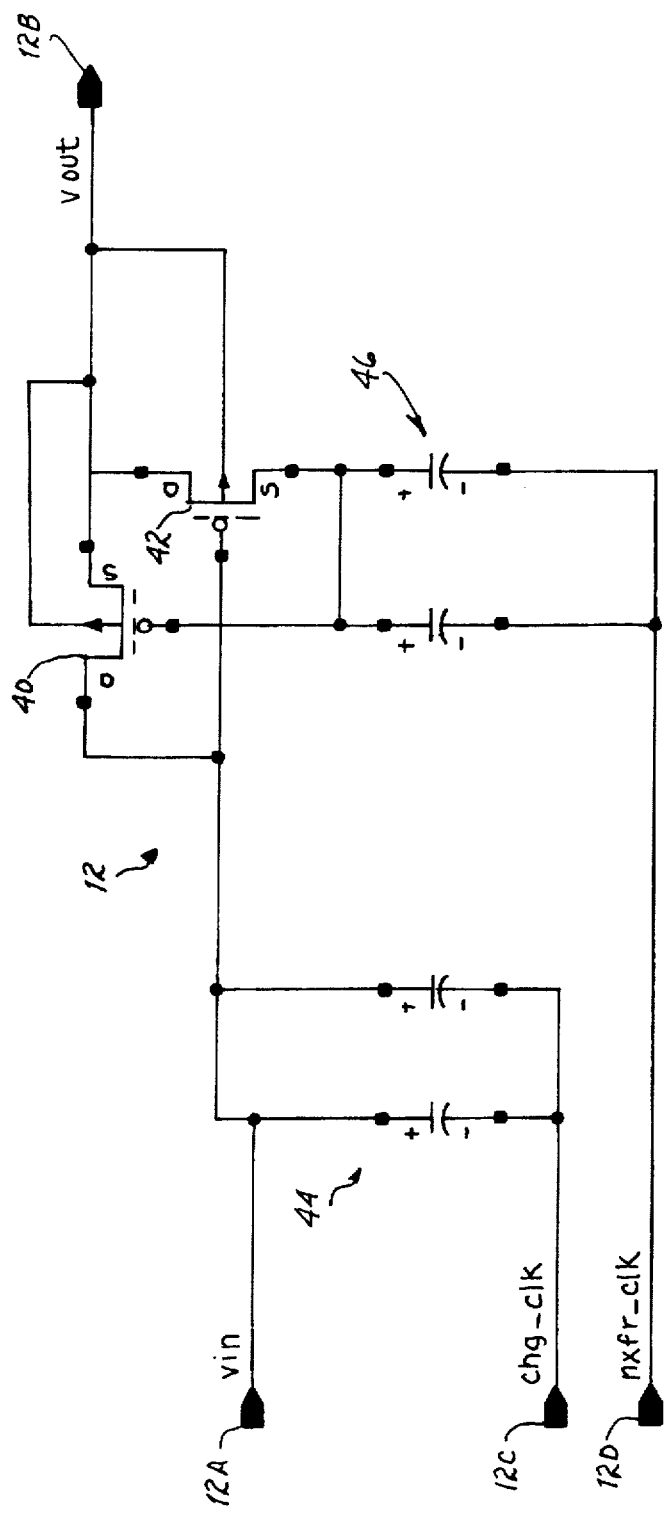
FIG. 3 is an electrical schematic of an individual stage of the progressive start-up multiple stage charge pump depicted in FIG. 1 wherein the stage is implemented using pmos devices.

Referring to FIG. 3 wherein like numerals and symbols represent like elements, a charge pump stage 12 is shown in detail. The charge pump stage 12 is implemented using pmos devices. The charge pump stage 12 is a standard charge pump stage 12 which is known to those skilled in the art. Thus, the operation of the charge pump stage 12 will not be described in detail. The charge pump stage 12 has a first pmos transistor 40 having a gate, a drain, and a source terminal. The drain terminal is coupled to the voltage input node 12A, the source is coupled to the voltage output node 12B. A well of the first pmos transistor 40 is coupled to the source terminal and thus the voltage output node 12B. A second pmos transistor 42 is also provided and also has a gate, a drain, and a source terminal. The drain terminal of the second pmos transistor 42 is coupled to the voltage output node 12B. The gate of the second pmos transistor 42 is coupled to the voltage input node 12A. A first capacitor bank 44 is provided and is coupled to the voltage input node 12A and to the charge clock input 12C. The first capacitor bank 44 is used for storing a charge to raise the voltage level of the voltage input node 12A. A second capacitor bank 46 is provided and is coupled to the gate of the first pmos transistor 40. The second capacitor bank 46 is used for turning on the first pmos transistor 40 so that a charge may be transferred from the voltage input node 12A to the voltage output node 12B.

OPERATION

Referring to FIGS. 1–3. the operation of the charge pump 10 will be described in detail. When the pump enable signal line 20 goes low the charge pump 10 is activated and ready for a progressive start-up. The first charge clock signal line 22 will go high which will go to the enable clock input 14B of the last charge pump enable circuit. This will activate the clock of the flip flop 30 of the last charge pump enable circuit. When the second transfer clock signal line 28 goes low the OR gate 38 of the last charge pump enable circuit will output a transfer clock signal which will activate the pmos transistor 40 of the last charge pump stage. This will allow the voltage at the voltage input 12A to be at the same potential as the voltage at the voltage output 12B for the last charge pump stage. The low transfer clock signal will also activate the clock of the flip flop 30 of the directly previous charge pump enable circuit. After the voltage at the voltage output 12B of the last charge pump stage has reached a certain level, the second transfer clock signal line 28 is brought low which will turn off the first pmos transistor 40 of the last charge pump stage. The second charge clock signal line 26 is then brought low which will pull the voltage input 12A down but not the voltage output 12B of the last charge pump stage. Thus the voltage output 12B is raised to a predetermined voltage level. The same process is then repeated for the penult charge pump stage using the first charge clock signal line 22 and the first transfer clock signal line 24. After the last two charge pump stages have been activated, the second to last charge pump stage will be activated. However, the second to last charge pump stage must be activated in tandem with the last charge pump stage. This will ensure that the voltage input nodes will not be at a higher potential than the voltage output nodes for each of the charge pump stages. The entire process is continuously repeated in alternating couples until the first charge pump stage has been activated.

While the invention has been particularly shown and described with reference to preferred embodiments thereof, it will be understood by those skilled in the art that the foregoing and other changes in form, and details may be made therein without departing from the spirit and scope of the invention.

What is claimed is:

1. A progressive start-up charge pump comprising, in combination:

a plurality of charge pump stage means for generating a desired output voltage for said progressive start-up charge pump wherein each of said plurality of charge pump stage means is implemented using p-channel devices, each of said plurality of charge pump stage means has a voltage input node and a voltage output node such that each of said plurality of charge pump stage means are coupled to a successive charge pump stage means in a cascade mode; and enabling means coupled to each of said plurality of charge pump stage means for individually starting each of said plurality of charge pump stage means one charge pump stage means at a time starting with a last charge pump stage means and successively turning on a directly previous charge pump stage means till said first of said plurality of charge pump stage means is started and for ensuring that said voltage output node is at a greater potential than said voltage input node for each of said plurality of charge pump stage means.

2. A progressive start-up charge pump in accordance with claim 1 wherein said enabling means comprises a plurality of enabling circuits equal in number to said plurality of charge pump stage means wherein a separate and different enabling circuit is individually coupled to a corresponding charge pump stage means, each of said plurality of enabling circuits having an enable clock input and a transfer clock output such that each of said plurality of enabling circuits are coupled together in cascade manner.

3. A progressive start-up charge pump in accordance with claim 2 wherein each of said plurality of enabling circuits comprises:

a flip flop having one input which is said enable clock input coupled to an enable clock signal and a second input coupled to a charge pump enable signal;

an AND gate having one input coupled to an output of said flip flop, a second input coupled to a charge clock signal, and a output coupled to a corresponding charge pump stage means for outputting said charge clock signal for raising a voltage level at said voltage input node of said corresponding charge pump stage means; and an OR gate having an input coupled to an inverted output of said flip flop, a second input coupled to a transfer clock signal, and an output which is said transfer clock output coupled in cascade to said enable clock input of a successive enabling circuit of said plurality of enabling circuits and to said corresponding charge pump stage means for enabling said successive enabling circuit of said plurality of enabling circuits and for outputting said transfer clock signal to allow a charge to transfer from said voltage input node to said voltage output node for said corresponding charge pump stage means.

4. A progressive start-up charge pump in accordance with claim 3 wherein said charge clock signal comprises:

a first charge clock signal coupled to said enable clock input of a last enabling circuit for enabling said last charge pump stage means and coupled to a penult enabling circuit and alternating enabling circuits after said penult enabling circuit for raising said voltage level at said voltage input node of a penult charge pump stage means and alternating charge pump stage means after said penult charge pump stage means; and a second charge clock signal coupled to said last enabling circuit and alternating enabling circuits after said last enabling circuit for raising said voltage level at said voltage input node of said last charge pump stage means and alternating charge pump stage means after said last charge pump stage means.

5. A progressive start-up charge pump in accordance with claim 3 wherein said transfer clock signal comprises:

a first transfer clock signal coupled to a penult enabling circuit and alternating enabling circuits after said penult enabling circuit for generating a signal to enable successive enabling circuits of said plurality of enabling circuits and to allow a charge to transfer from said voltage input node to said voltage output node for said penult charge pump stage means and alternating charge pump stage means after said penult charge pump stage means; and a second transfer clock signal coupled to a last enabling circuit and alternating enabling circuits after said last enabling circuit for generating a signal to enable successive enabling circuit of said plurality of enabling circuits and to allow a charge to transfer from said voltage input node to said voltage output node for said last charge pump stage means and alternating charge pump stage means after said last charge pump stage means.

6. A progressive start-up charge pump in accordance with claim 3 wherein said enable clock signal is a reset signal which is used to turn off said progressive start-up charge pump and for activating said progressive start-up charge pump.

7. A progressive start-up charge pump in accordance with claim 2 wherein each of said plurality of charge pump stage means comprises:

a first pmos transistor having a gate, a drain, and a source terminal wherein said drain terminal is coupled to said voltage input node, said source is coupled to said voltage output node, and a well of said first pmos transistor is coupled to said source terminal;

a second pmos transistor having a gate, a drain, and a source terminal wherein said drain terminal is coupled to said voltage output node, and said gate is coupled to said voltage input node;

first capacitor bank means coupled to said voltage input node and to a charge clock signal for storing a charge to raise a voltage of said voltage input node; and second capacitor bank means coupled to said gate of said first pmos transistor and to a transfer clock signal for turning on said first pmos transistor.

8. A method of providing a progressive start-up charge pump comprising the steps of:

providing a plurality of charge pump stage means for generating a desired output voltage for said progressive start-up charge pump wherein each of said plurality of charge pump stage means is implemented using p-channel devices, each of said plurality of charge pump stage means has a voltage input node and a voltage output node such that each of said plurality of charge pump stage means are coupled to a successive charge pump stage means in a cascade mode; and providing enabling means coupled to each of said plurality of charge pump stage means for individually starting each of said plurality of charge pump stage means one charge pump stage means at a time starting with a last charge pump stage means and successively turning on a directly previous charge pump stage means till said first of said plurality of charge pump stage means is started and for ensuring that said voltage output node is at a greater potential than said voltage input node for each of said plurality of charge pump stage means.

9. The method of claim 8 wherein said step of providing enabling means further comprises the step of providing a plurality of enabling circuits equal in number to said plurality of charge pump stage means wherein a separate and different enabling circuit is individually coupled to a corresponding charge pump stage means, each of said plurality of enabling circuits having an enable clock input and a transfer clock output such that each of said plurality of enabling circuits are coupled together in cascade manner.

10. The method of claim 9 wherein each of said plurality of enabling circuits further comprises the steps of:

providing a flip flop having one input which is said enable clock input coupled to an enable clock signal and a second input coupled to a charge pump enable signal;

providing an AND gate having one input coupled to an output of said flip flop, a second input coupled to a charge clock signal, and a output coupled to a corresponding charge pump stage means for outputting said charge clock signal for raising a voltage level at said voltage input node of said corresponding charge pump stage means; and providing an OR gate having an input coupled to an inverted output of said flip flop, a second input coupled to a transfer clock signal, and an output which is said transfer clock output coupled in cascade to said enable clock input of a successive enabling circuit of said plurality of enabling circuits and to said corresponding charge pump stage means for enabling said successive enabling circuit of said plurality of enabling circuits and for outputting said transfer clock signal to allow a charge to transfer from said voltage input node to said voltage output node for said corresponding charge pump stage means.

11. The method of claim 10 wherein said step of providing an AND gate having a second input coupled to a charge clock signal further comprises the steps of:

providing a first charge clock signal coupled to said enable clock input of a last enabling circuit for enabling said last charge pump stage means and coupled to a penult enabling circuit and alternating enabling circuits after said penult enabling circuit for raising said voltage level at said voltage input node of a penult charge pump stage means and alternating charge pump stage means after said penult charge pump stage means; and providing a second charge clock signal coupled to said last enabling circuit and alternating enabling circuits after said last enabling circuit for raising said voltage level at said voltage input node of said last charge pump stage means and alternating charge pump stage means after said last charge pump stage means.

12. The method of claim 10 wherein said step of providing an OR gate having a second input coupled to a transfer clock signal further comprises the steps of:

providing a first transfer clock signal coupled to a penult enabling circuit and alternating enabling circuits after said penult enabling circuit for generating a signal to enable successive enabling circuits of said plurality of enabling circuits and to allow a charge to transfer from said voltage input node to said voltage output node for said penult charge pump stage means and alternating charge pump stage means after said penult charge pump stage means; and providing a second transfer clock signal coupled to a last enabling circuit and alternating enabling circuits after said last enabling circuit for generating a signal to enable successive enabling circuit of said plurality of enabling circuits and to allow a charge to transfer from said voltage input node to said voltage output node for said last charge pump stage means and alternating charge pump stage means after said last charge pump stage means.

13. The method of claim 10 wherein said step of providing a flip flop having a second input coupled to a charge pump enable signal further comprises the step of providing said enable clock signal that is a reset signal which is used to turn off said progressive start-up charge pump and for activating said progressive start-up charge pump.

14. The method of claim 9 wherein each of said plurality of charge pump stage means further comprises the steps of:

providing a first pmos transistor having a gate, a drain, and a source terminal wherein said drain terminal is coupled to said voltage input node, said source is coupled to said voltage output node, and a well of said first pmos transistor is coupled to said source terminal;

providing a second pmos transistor having a gate, a drain, and a source terminal wherein said drain terminal is coupled to said voltage output node, and said gate is coupled to said voltage input node;

providing first capacitor bank means coupled to said voltage input node and to a charge clock signal for storing a charge to raise a voltage of said voltage input node; and providing second capacitor bank means coupled to said gate of said first pmos transistor and to a transfer clock signal for turning on said first pmos transistor.

\* \* \* \* \*